(12) United States Patent
Kim

(10) Patent No.: US 6,412,369 B1
(45) Date of Patent: Jul. 2, 2002

(54) FOUR-WHEEL VEHICLE DRIVE SYSTEM

(75) Inventor: Jae-Kwon Kim, Anyang (KR)

(73) Assignees: Hyundai Motor Company, Seoul; Kia Motor Corporation, Kyungki-Do, both of (KR)

( * ) Notice: Subject to any disclaimer, the term of this patent is extended or adjusted under 35 U.S.C. 154(b) by 0 days.

(21) Appl. No.: 09/578,268

(22) Filed: May 24, 2000

(30) Foreign Application Priority Data

Oct. 1, 1999 (KR) ............................................. 99-42222

(51) Int. Cl.[7] ............................................. F16H 37/06
(52) U.S. Cl. ................................. 74/665 GA; 180/247
(58) Field of Search ......................... 74/665 GA, 665 S, 74/665 T; 180/247

(56) References Cited

U.S. PATENT DOCUMENTS

| | | | | |
|---|---|---|---|---|
| 4,292,860 A | * | 10/1981 | Kako et al. | ............. 74/655 GA |
| 4,559,846 A | * | 12/1985 | Cochran et al. | ........ 74/665 GA |
| 4,745,825 A | * | 5/1988 | Yamamoto | ............. 74/665 GA |
| 4,781,266 A | * | 11/1988 | Hotta et al. | .................. 180/248 |
| 4,901,598 A | * | 2/1990 | Batchelor et al. | ....... 74/665 GA |
| 5,054,335 A | * | 10/1991 | Andrews | ................ 74/665 GA |
| 5,168,956 A | * | 12/1992 | Namioka | ..................... 180/248 |
| 5,271,478 A | * | 12/1993 | Kameda et al. | ............. 180/247 |

* cited by examiner

*Primary Examiner*—Dirk Wright
(74) *Attorney, Agent, or Firm*—Christie, Parker & Hale, LLP

(57) ABSTRACT

A four-wheel vehicle drive system for a part-time 4-wheel drive vehicle having a high-speed 2-wheel drive mode, a high-speed 4-wheel drive mode, and a low-speed 4-wheel drive mode. The four-wheel vehicle drive system includes a power receiving gear mechanism receiving power from an engine through a transmission, a rear wheel shaft gear mechanism for transmitting rotating force to rear wheels, the rear wheel shaft gear mechanism having a high speed section and a low speed section, a power transmitting gear mechanism for transmitting power from the power receiving gear mechanism to the rear wheel shaft gear mechanism, a front wheel shaft mechanism for selectively transmitting rotating force to front wheels; and a shift control device connected to the rear wheel shaft gear mechanism and the front wheel shaft mechanism to selectively power-couple the rear wheel shaft gear mechanism to the front wheel shaft gear mechanism and one of the high and low speed sections to the rear wheels.

10 Claims, 4 Drawing Sheets

FOUR-WHEEL VEHICLE DRIVE SYSTEM

To achieve the above objective, the present invention provides a transfer case for a part-time 4-wheel drive vehicle having a high-speed 2-wheel drive mode, a high-speed 4-wheel drive mode, and a low-speed 4-wheel drive mode, the transfer case comprising a power receiving gear mechanism receiving power from an engine through a transmission, a rear wheel shaft gear mechanism for transmitting rotating force to rear wheels, the rear wheel shaft gear mechanism having a high speed section and a low speed section, a power transmitting gear mechanism for transmitting power from the power receiving gear mechanism to the rear wheel shaft gear mechanism, a front wheel shaft mechanism for selectively transmitting rotating force to front wheels; and a shift control device connected to the rear wheel shaft gear mechanism and the front wheel shaft mechanism to selectively power-couple the rear wheel shaft gear mechanism to the front wheel shaft gear mechanism and one of the high and low speed sections to the rear wheels.

The power receiving gear mechanism comprises a main shaft receiving power from the engine and a main shaft gear mounted on the main shaft.

The rear wheel shaft gear mechanism comprises a rear wheel drive shaft disposed in parallel with the main shaft of the power receiving mechanism, a high-speed gear rotatably mounted on the rear wheel drive shaft, a low-speed gear rotatably mounted on the rear wheel drive shaft, and a low/high sleeve for fixedly coupling one of the high and low-speed gears to the rear wheel drive shaft.

The power transmitting gear mechanism comprises a gear shaft disposed in parallel between the main shaft and the rear wheel drive shaft, an intermediate high-speed gear engaged between the main shaft gear 3 of the power receiving gear mechanism and the high-speed gear of the rear wheel drive shaft, and an intermediate low-speed gear engaged with the low-speed gear of the rear wheel drive shaft.

The front wheel shaft mechanism comprises a front wheel drive shaft disposed on a common axis with the rear wheel drive shaft, and a 2-wheel/4-wheel sleeve for selectively coupling the front wheel drive shaft to the rear wheel drive shaft.

The rear wheel shaft gear mechanism further comprises a first hub coupled to the high-speed gear, a second hub coupled to the low-speed gear, and a third hub integrally formed with the rear wheel drive shaft between the first and second hubs, the third hub being selectively coupled to one of the first and second hubs in accordance with the operation of the shift control mechanism, thereby forming the high and low speed sections.

The rear wheel shaft gear mechanism further comprises a fourth hub integrally formed with the rear wheel drive shaft, at one end abutting one end of the front wheel drive shaft of the front wheel shaft mechanism, and the front wheel shaft comprises a fifth hub integrally formed with the front wheel drive shaft, at the one end abutting the one end of the rear wheel drive shaft, the fourth and fifth hubs being selectively coupled to each other according to the operation of the shift control mechanism, thereby selectively transmitting power from the rear wheel drive shaft to the front wheels through the front wheel shaft mechanism.

The shift control mechanism comprises a shift rod disposed in parallel to the front and rear wheel drive shafts, and a transfer lever connected to the rod, the shift rod being provided with a 2W-4W fork coupled to the 2W-4W sleeve of the front wheel shaft mechanism and a high/low fork coupled to the high/low sleeve.

BRIEF DESCRIPTION OF THE DRAWINGS

The accompanying drawings, which are incorporated in and constitute a part of the specification, illustrate an embodiment of the present invention, and, together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings.

Figure 1:
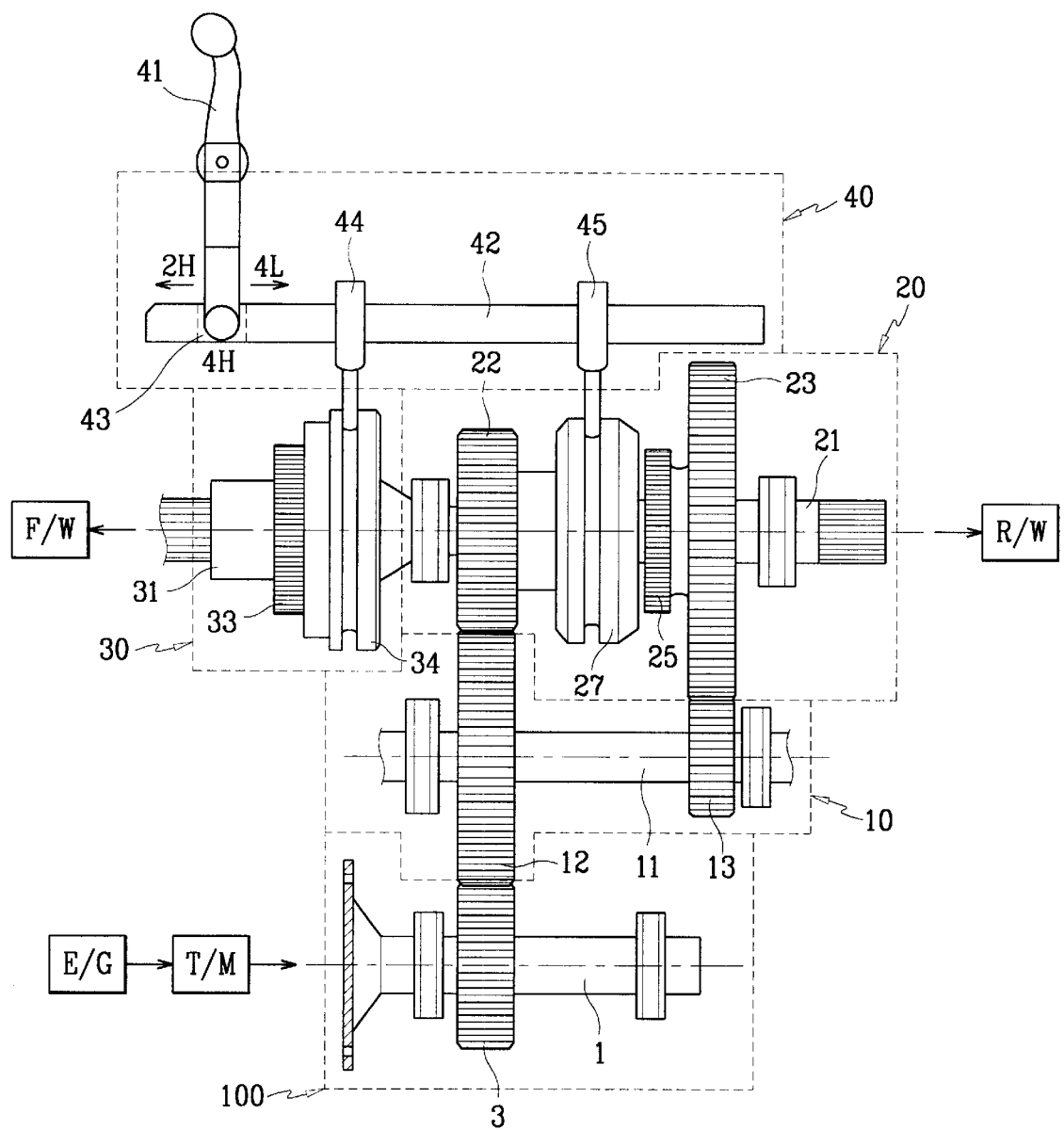
FIG. 1 is a schematic diagram of a gear arrangement of a transfer case according to a preferred embodiment of the present invention.

FIG. 1 shows a transfer case according to a preferred embodiment of the present invention. A transfer case of the present invention is a part-time transfer case that can drive a vehicle in either 2-wheel or 4-wheel drive.

A transfer case comprises a power receiving gear mechanism 100 receiving power from an engine E/G through a transmission T/M, a rear wheel shaft gear mechanism 20 for transmitting rotating force to rear wheels R/W, a power transmitting gear mechanism 10 for transmitting power from the power receiving gear mechanism 100 to the rear wheel shaft gear mechanism 20, a front wheel shaft mechanism 30 for selectively transmitting rotating force to front wheels F/W, and a shift control device 40 connected to the rear wheel shaft gear mechanism 20 and the front wheel shaft mechanism 30.

The power receiving gear mechanism 100 comprises a main shaft 1 receiving power from the engine and a main shaft gear 3 mounted on the main shaft 1. The rear wheel shaft gear mechanism 20 comprises a rear wheel drive shaft 21 disposed in parallel with the main shaft 1 of the power receiving mechanism 100, a high-speed gear 22 mounted on the rear wheel drive shaft 21, a low-speed gear 23 mounted on the rear wheel drive shaft 21, and a low/high sleeve 27 for selectively coupling the high and low-speed gears 22 and 23 to the rear wheel drive shaft 21.

The power transmitting gear mechanism 10 comprises a gear shaft 1 disposed in parallel between the main shaft 1 and the rear wheel drive shaft 21, an intermediate high-speed gear 12 engaged between the main shaft gear 3 of the power receiving gear mechanism 100 and the high-speed gear 22 of the rear wheel drive shaft 21, and an intermediate low-speed gear 13 engaged with the low-speed gear 23 of the rear wheel drive shaft 21.

The front wheel shaft mechanism 30 comprises a front wheel drive shaft 31 disposed on a common axis with the rear wheel drive shaft 21, and a 2-wheel/4-wheel sleeve 34 for selectively coupling the front wheel drive shaft 31 to the rear wheel drive shaft 21.

Figure 2:
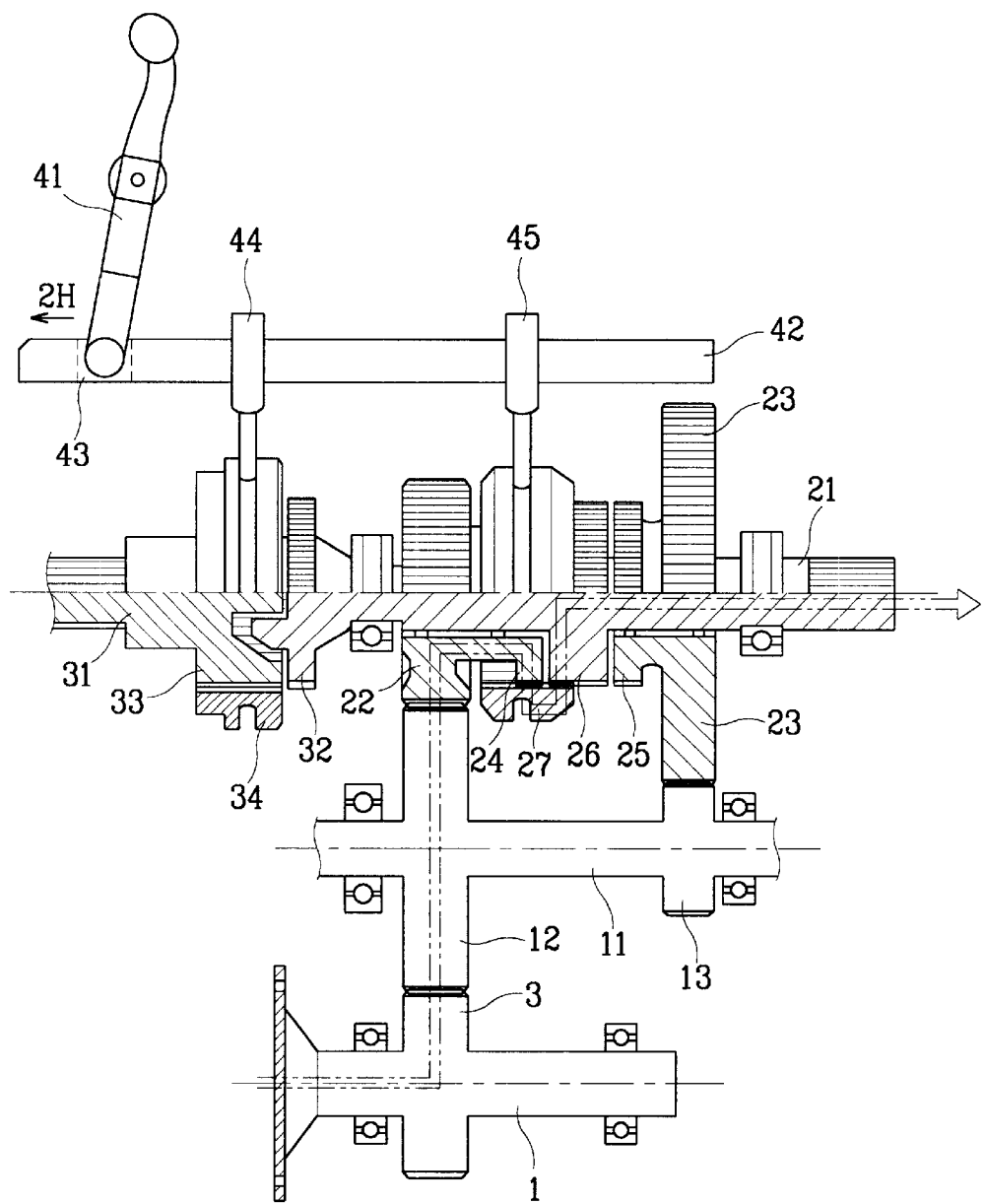
FIG. 2 is a schematic diagram illustrating a gear operation state during a high-speed 2-wheel driving mode of a transfer case according to a preferred embodiment of the present invention.

As shown in FIG. 2, the rear wheel shaft gear mechanism 20 further comprises a first hub 24 coupled to the high-speed gear 22, a second hub 25 coupled to the low-speed gear 23, and a third hub 26 integrally formed with the rear wheel drive shaft 21 between the first and second hubs 24 and 25. The third hub 26 is selectively coupled to one of the first and second hubs 24 and 25 in accordance with the movement of the low/high sleeve 27, thereby varying rotating speed of the rear wheel drive shaft 21.

The rear wheel shaft gear mechanism 20 further comprises a fourth hub 32 integrally formed with the rear wheel drive shaft 21 with one end abutting one end of the front wheel drive shaft 31 of the front wheel shaft mechanism 30. The front wheel shaft 30 comprises a fifth hub 33 integrally formed with the front wheel drive shaft 31 with one end abutting the one end of the rear wheel drive shaft 21. The fourth and fifth hubs 32 and 33 are selectively coupled to each other by the movement of the 2-wheel/4-wheel sleeve 34, thereby selectively transmitting power from the rear wheel drive shaft 21 to the front wheels through the front wheel shaft mechanism 30.

The shift control mechanism 40 for selectively coupling the rear wheel drive shaft 21 to the front wheel drive shaft 31 and to one of the high and low-speed gears 22 and 23 comprises a shift rod 42 disposed in parallel to the front and rear wheel drive shafts 31 and 21, and a transfer lever 41 connected to one end 43 of the rod 42.

The shift rod 42 is provided with a 2W-4W fork 44 coupled to the 2W-4W sleeve 34 of the front wheel shaft mechanism 30 and a high/low fork 45 coupled to the high/low sleeve 27.

The operation of the above described transfer case will be described hereinafter.

To realize a high-speed 2-wheel driving mode, the transfer lever 41 is manipulated such that the shift rod 42 is displaced leftward as shown in FIG. 2. As a result, the 2W-4W sleeve 34 and the high/low sleeve 27 respectively coupled to the 2W-4W fork 44 and the high/low fork 45 mounted on the shift rod 42 are moved leftward, such that the fifth hub 33 integrally formed on the front wheel drive shaft 31 of the front wheel shaft mechanism 30 is disconnected from the fourth hub 32 integrally formed on the rear wheel drive shaft 21, and the third hub 26 integrally formed on the rear wheel drive shaft 21 is coupled to the first hub 24 integrally formed with the high speed gear 22.

Therefore, engine power transmitted to the main shaft 1 through the transmission is transmitted to the rear wheel drive shaft 21 through the intermediate high speed gear 12 of the power transmitting gear mechanism 10 and the high speed gear 22 of the rear wheel shaft mechanism 20, thereby realizing the high-speed 2-wheel driving mode as shown in FIG. 2.

At this point, since the fifth hub 33 integrally formed with the front wheel drive shaft 31 is disconnected from the fourth hub 32 integrally formed with the rear wheel drive shaft 21, rotating force of the rear wheel drive shaft 21 is not transmitted to the front wheel drive shaft 31. In addition, since the second hub 24 integrally formed with the low speed gear 23 is not coupled to the third hub 26 integrally formed with the rear wheel drive shaft 21, the low speed gear 3 engaged with the intermediate low speed gear 13 just idles.

Figure 3:
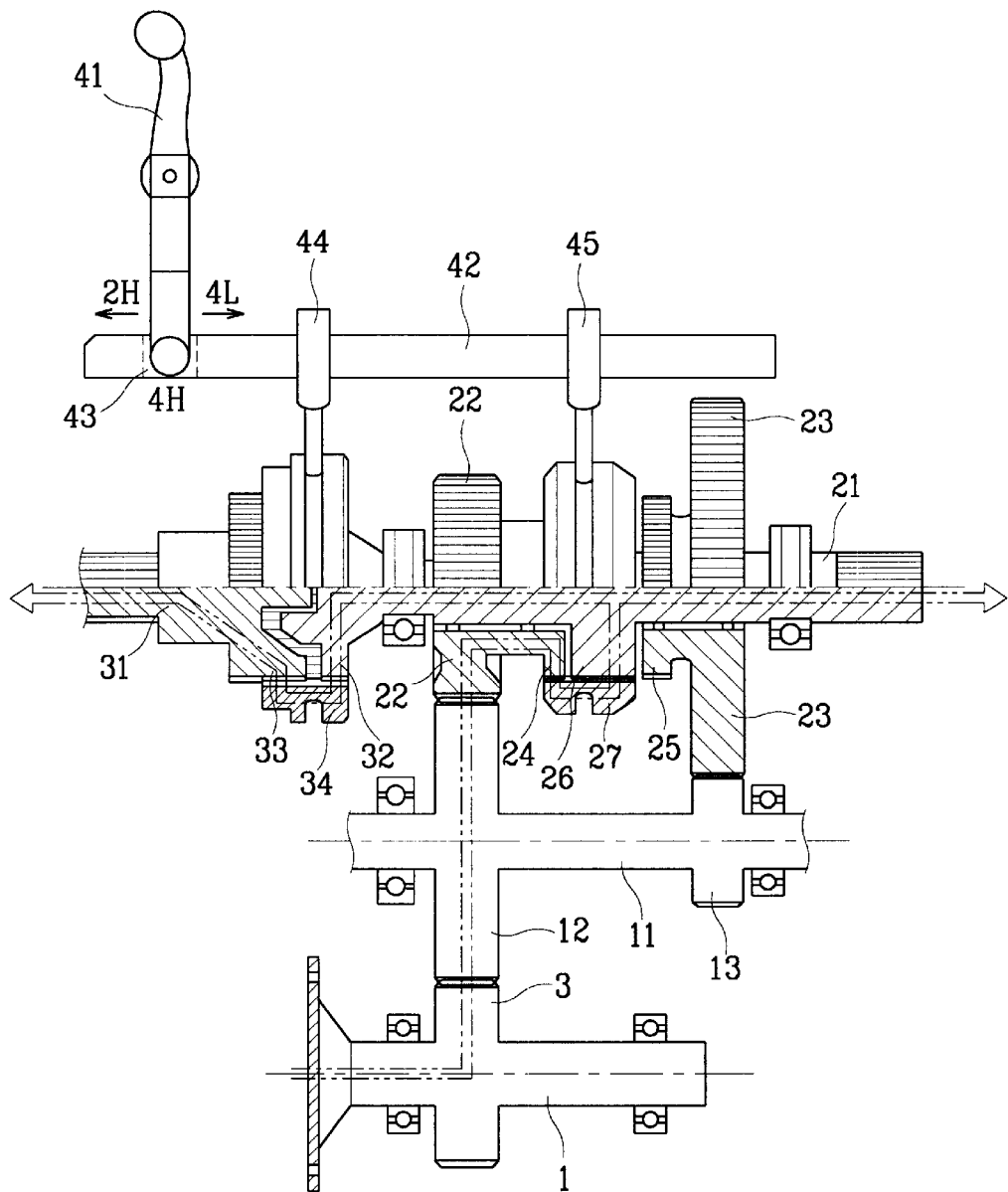
FIG. 3 is a schematic diagram illustrating a gear operation state during a high-speed 4-wheel driving mode of a transfer case according to a preferred embodiment of the present invention.

To realize a high-speed 4-wheel driving mode, the transfer lever 41 is manipulated such that the shift rod 42 is displaced rightward as shown in FIG. 3. As a result, the 2W-4W sleeve 34 and the high/low sleeve 27 respectively coupled to the 2W-4W fork 44 and the high/low fork 45 mounted on the shift rod 42 are moved rightward, such that the fifth hub 34 integrally formed on the front wheel drive shaft 31 of the front wheel shaft mechanism 30 is coupled to the fourth hub 32 integrally formed on the rear wheel drive shaft 21, and the third hub 26 integrally formed on the rear wheel drive shaft 21 is still coupled to the second hub 24 integrally formed with the high speed gear 22.

Therefore, engine power transmitted to the main shaft 1 through a transmission is transmitted to the rear wheel drive shaft 21 through the intermediate high speed gear 12 of the power transmitting gear mechanism 10 and the high speed gear 22 of the speed variable gear mechanism 20, and is further transmitted to the front wheel drive shaft 31 through the coupled hubs 33 and 32, thereby realizing the high-speed 4-wheel driving mode as shown in FIG. 3.

At this point, since the second hub 25 integrally formed with the low speed gear 23 is not coupled to the third hub 26 integrally formed with the rear wheel drive shaft 21, the low speed gear 3 engaged with the intermediate low speed gear 13 idles.

Figure 4:
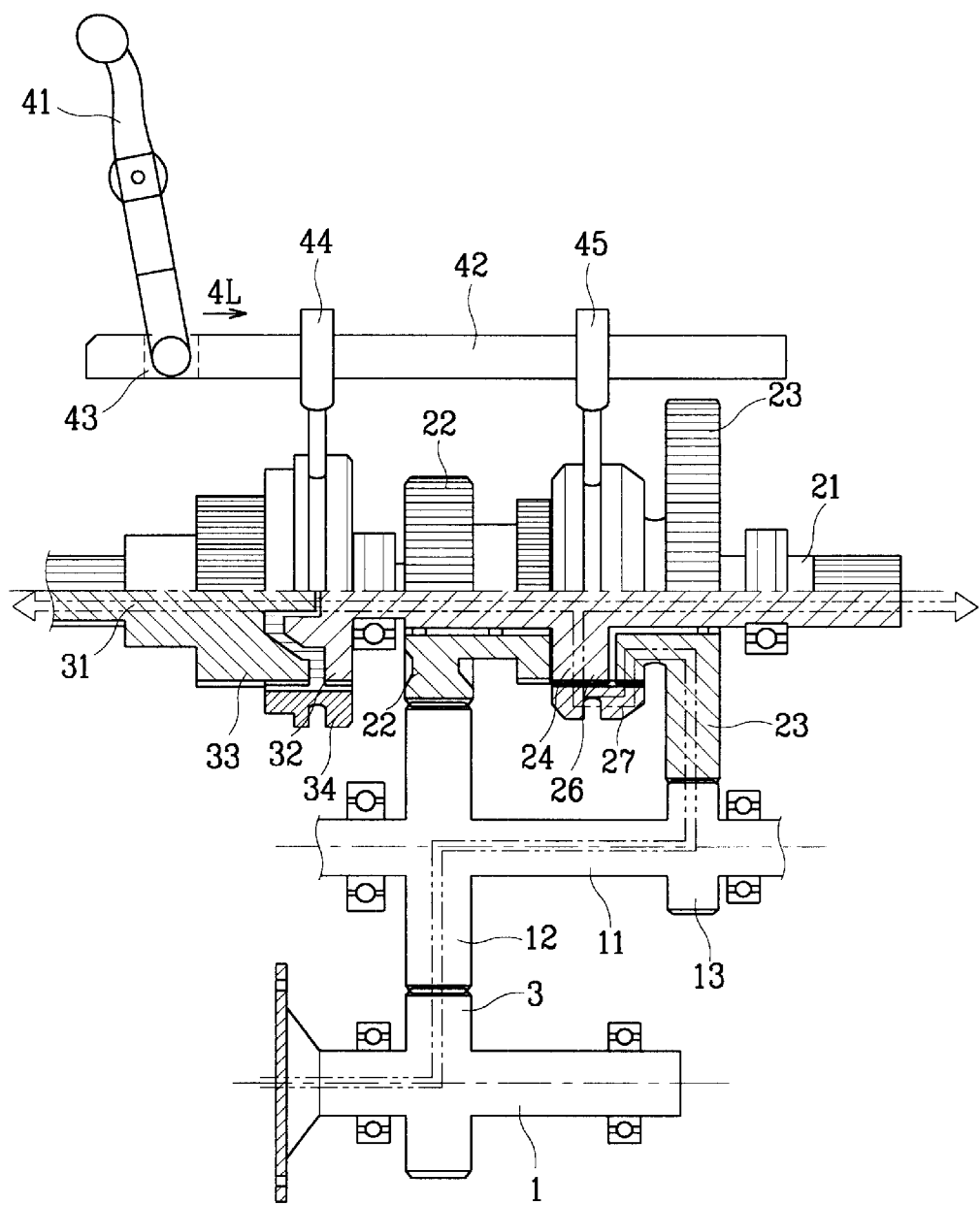
FIG. 4 is a sectional diagram illustrating a gear operation state during a low-speed 4-wheel driving mode of a transfer case according to a preferred embodiment of the present invention.

To realize a low-speed 4-wheel driving mode, the transfer lever 41 is manipulated such that the shift rod 42 is further displaced rightward as shown in FIG. 4. As a result, the 2W-4W sleeve 34 and the high/low sleeve 27 respectively coupled to the 2W-4W fork 44 and the high/low fork 45 mounted on the shift rod 42 are further moved rightward, such that the fifth hub 34 integrally formed on the front wheel drive shaft 31 of the front wheel shaft mechanism 30 is still coupled to the fourth hub 32 integrally formed on the rear wheel drive shaft 21, and the third hub 26 integrally formed on the rear wheel drive shaft 21 is disconnected from the second hub 24 integrally formed with the high speed gear 22, but coupled to the second hub 25 integrally formed with the low speed gear 23.

Therefore, engine power transmitted to the main shaft 1 through a transmission is transmitted to the rear wheel drive shaft 21 through the intermediate low speed gear 13 of the power transmitting gear mechanism 10 and the low speed gear 23 of the rear wheel shaft mechanism 20, and is further transmitted to the front wheel drive shaft 31 through the coupled hubs 33 and 32, thereby realizing the low-speed 4-wheel driving mode as shown in FIG. 3.

At this point, since the first hub 24 integrally formed with the high speed gear 22 is not coupled to the third hub 26 integrally formed with the rear wheel drive shaft 21, the high speed gear 22 engaged with the intermediate high speed gear 12 idles.

As described above, since the shifting is performed by a simple manipulation along a straight line, the structure of the transfer case can be simplified, reducing the manufacturing costs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. Four-wheel vehicle drive system having a high-speed 2-wheel drive mode, a high-speed 4-wheel drive mode, and a low-speed 4-wheel drive mode, the transfer case comprising:

a power receiving gear mechanism receiving power from an engine through a transmission;

a rear wheel shaft gear mechanism for transmitting rotating force to rear wheels, the rear wheel shaft gear mechanism having a high speed section and a low speed section;

a power transmitting gear mechanism for transmitting power from the power receiving gear mechanism to the rear wheel shaft gear mechanism;

a front wheel shaft mechanism for selectively transmitting rotating force to front wheels; and a shift control device connected to the rear wheel shaft gear mechanism and the front wheel shaft mechanism to selectively power-couple the rear wheel shaft gear mechanism to the front wheel shaft gear mechanism and one of the high and low speed sections to the rear wheels.

2. Four-wheel vehicle drive system of claim 1 wherein the power receiving gear mechanism comprises a main shaft receiving power from the engine and a main shaft gear mounted on the main shaft.

3. Four-wheel vehicle drive system of claim 2 wherein the rear wheel shaft gear mechanism comprises a rear wheel drive shaft disposed in parallel with the main shaft of the power receiving mechanism, a high-speed gear rotatably mounted on the rear wheel drive shaft, a low-speed gear rotatably mounted on the rear wheel drive shaft, and a low/high sleeve for fixedly coupling one of the high and low-speed gears to the rear wheel drive shaft.

4. Four-wheel vehicle drive system of claim 3 wherein the power transmitting gear mechanism comprises a gear shaft disposed in parallel between the main shaft and the rear wheel drive shaft, an intermediate high-speed gear engaged between the main shaft gear 3 of the power receiving gear mechanism and the high-speed gear of the rear wheel drive shaft, and an intermediate low-speed gear engaged with the low-speed gear of the rear wheel drive shaft.

5. Four-wheel vehicle drive system of claim 2 wherein the front wheel shaft mechanism comprises a front wheel drive shaft disposed on a common axis with the rear wheel drive shaft, and a 2-wheel/4-wheel sleeve for selectively coupling the front wheel drive shaft to the rear wheel drive shaft.

6. Four-wheel vehicle drive system of claim 5 wherein the rear wheel shaft gear mechanism further comprises a first hub coupled to the high-speed gear, a second hub coupled to the low-speed gear, and a third hub integrally formed with the rear wheel drive shaft between the first and second hubs, the third hub being selectively coupled to one of the first and second hubs in accordance with the operation of the shift control mechanism, thereby forming the high and low speed sections.

7. Four-wheel vehicle drive system of claim 6 wherein the rear wheel shaft gear mechanism further comprises a fourth hub integrally formed with the rear wheel drive shaft, at one end abutting one end of the front wheel drive shaft of the front wheel shaft mechanism, and the front wheel shaft comprises a fifth hub integrally formed with the front wheel drive shaft, at the one end abutting the one end of the rear wheel drive shaft, the fourth and fifth hubs being selectively coupled to each other according to the operation of the shift control mechanism, thereby selectively transmitting power from the rear wheel drive shaft to the front wheels through the front wheel shaft mechanism.

8. Four-wheel vehicle drive system of claim 7 wherein the shift control mechanism comprises a shift rod disposed in parallel to the front and rear wheel drive shafts, and a transfer lever directly connected to the rod, the shift rod being provided with a 2W-4W fork coupled to the 2W-4W sleeve of the front wheel shaft mechanism and a high/low fork coupled to the high/low sleeve, the 2W-4W fork and the high/low fork simultaneously moves in accordance with a manipulation of the transfer lever.

9. Four-wheel vehicle drive system for a part-time 4-wheel drive vehicle, comprising:

a rear wheel drive mechanism having a rear wheel drive shaft, a high speed gear disposed on the rear wheel drive shaft, and a low speed gear disposed on the rear wheel drive shaft, the high and low speed gears receiving power from an engine through a transmission;

a front wheel drive mechanism having a front wheel drive shaft disposed on an identical axis of the rear wheel drive shaft; and a shift control device for power-coupling the rear wheel drive shaft to the front wheel shaft gear mechanism and to one of the high and low speed gears to realize one of high-speed 2-wheel, high-speed 4-wheel, and low-speed 4-wheel drive modes.

10. Four-wheel vehicle drive system of claim 9 wherein the shift control device comprises:

a shift rod disposed in parallel to the front and rear wheel drive shafts;

a transfer lever directly connected to the rod to move the shift rod between the high-speed 2-wheel, high-speed 4-wheel, and low-speed 4-wheel drive modes along an axis in parallel to the front and rear wheel drive shafts;

a 2W-4W fork for coupling the front and rear wheel drive shafts; and a high/low fork for coupling one of the high and low speed gears to the rear wheel shaft the high/low fork moving simultaneously with the 2W-4W fork in accordance with the movement of the transfer lever cooperating with the shift rod.

* * * * *